3,808,204
1-[(5-NITROFURFURYLIDENE)AMINO]HEXA-HYDROBENZIMIDAZOL-2(3H)-ONE
Harry R. Snyder, Jr., Norwich, N.Y., assignor to Morton-Norwich Products, Inc.
No Drawing. Filed Jan. 12, 1973, Ser. No. 323,074
Int. Cl. C07d 49/38
U.S. Cl. 260—240 A          1 Claim

ABSTRACT OF THE DISCLOSURE
The title compound is an effective antimicrobial agent.

This invention is concerned with chemical compounds. More particularly it is concerned with 1-[(5-nitrofurfurylidene)amino]hexahydrobenzimidazol - 2(3H) - one. This compound is an effective antibacterial agent and is adapted to be combined in the form of dusts, solutions, sprays, elixirs and unguents to provide compositions suitable for the eradication or prevention of bacterial growth. Its capability in this respect is reflected in the table herebelow showing its antibacterial potency toward a variety of bacterial species in the commonly used serial dilution technique:

In vitro antibacterial activity in mcg./ml.

| | |
|---|---|
| S. aureus | 6 |
| E. coli | 3 |
| S. typhosa | 12.5 |
| S. pyogenes | 12.5 |
| S. agalactiae | 25 |
| E. insidiosa | 25 |

Upon peroral administration, suspended in aqueous sodium carboxymethyl cellulose, to mice lethally infected with Staphylococcus aureus a dose of 100 mg./kg. of this compound prevents death in 50% of the animals.

The compound of this invention when combined in animal feed at a level of 0.022% by weight and offered ad libitum to fowl exposed to or infected with Eimeria tenella or Salmonella gallinarum prevents the ravages of coccidiosis and typhoid.

The method of preparing the compound of this invention which is currently preferred consists in nitrosating hexahydro - 2 - benzimidazolone; reducing the nitrosated product; and effecting condensation with 5-nitrofurfural. An illustrative example of this method is supplied.

To hexahydro-2-benzimidazolone (70.0 g., 0.5 mole) dissolved in 2 N sulfuric acid (1500 ml.) at 50° C. was added over 15 minutes sodium nitrite (40.0 g., 0.58 mole) while keeping the temperature at 5–6° C. After stirring at 5° C. for 1.25 hr., zinc dust (80.0 g., 1.23 moles) was added over one hour at <20° C. The mixture was stirred for thirty minutes with ice bath cooling and then for one hour at room temperature. The reaction mixture was filtered. A solution of 5-nitrofurfural (70.0 g., 0.5 mole) in alcohol (500 ml.) was added to the filtrate. After chilling, the product was collected, washed with water and dried to yield 87.0 g. (62.5%), M.P. 185° C.

The material may be recrystallized from isopropanol to yield 75.8 g., M.P. 192–194° C. dec. (corr.)

Analysis.—Calcd. for $C_{12}H_{14}N_4O_4$ (percent): C, 51.79; H, 5.07; N, 20.14. Found (percent): C, 51.91, 52.06; H, 5.36, 5.40; N, 19.95, 20.09.

What is claimed is:
1. 1 - [(5 - nitrofurfurylidene)amino]hexahydrobenzimidazol-2(3H)-one.

References Cited
UNITED STATES PATENTS 2,776,979   1/1957   Michels _____ 260—309.7

OTHER REFERENCES

Hussain et al.: J. Med. Chem. vol. 14, pp. 138 to 144 (1971).

JOHN D. RANDOLPH, Primary Examiner

U.S. Cl. X.R.

424—273; 260—309.7